United States Patent [19]
Severinsson et al.

[11] 3,891,280
[45] June 24, 1975

[54] DEVICE RESPONSIVE TO VEHICLE LOADING WITH SIGNAL GENERATING MEANS FOR BRAKE ACTUATION

[75] Inventors: Lars Mattis Severinsson, Malmo; Gert Artur Persson, Oxie, both of Sweden

[73] Assignee: Svenska Aktiebolaget Bromsregulator, Malmo, Sweden

[22] Filed: Nov. 28, 1972

[21] Appl. No.: 310,116

[30] Foreign Application Priority Data
Dec. 4, 1971 United Kingdom............... 56416/71

[52] U.S. Cl................................ 303/22 R; 188/195
[51] Int. Cl............................................... B60t 8/18
[58] Field of Search.................. 303/22 R, 22 A, 23; 188/195, 217

[56] References Cited
UNITED STATES PATENTS

| 3,147,044 | 9/1964 | Glass | 303/22 A |
| 3,304,129 | 2/1967 | Wilson | 303/22 R |
| 3,413,042 | 11/1968 | Herold | 303/22 A |
| 3,504,698 | 4/1970 | Frill | 303/22 A |
| 3,671,086 | 6/1972 | Scott | 303/22 R |
| 3,734,574 | 5/1973 | Lewis | 303/22 R |

FOREIGN PATENTS OR APPLICATIONS

| 1,350,030 | 12/1962 | France | 303/22 R |

Primary Examiner—Duane A. Reger
Assistant Examiner—D. C. Butler
Attorney, Agent, or Firm—Laurence R. Brown

[57] ABSTRACT

A force transmitting device for automotive vehicle use has a piston movable under force such as weight appearing between two vehicle parts. A plastic deformable body within the piston communicates with a rod biased by an adjustable spring to transmit movement as a function of the force. Coupled to the rod is a valve which controls a supply of compressed air for example, that can be released whenever the vehicle load exceeds a predetermined value.

2 Claims, 1 Drawing Figure

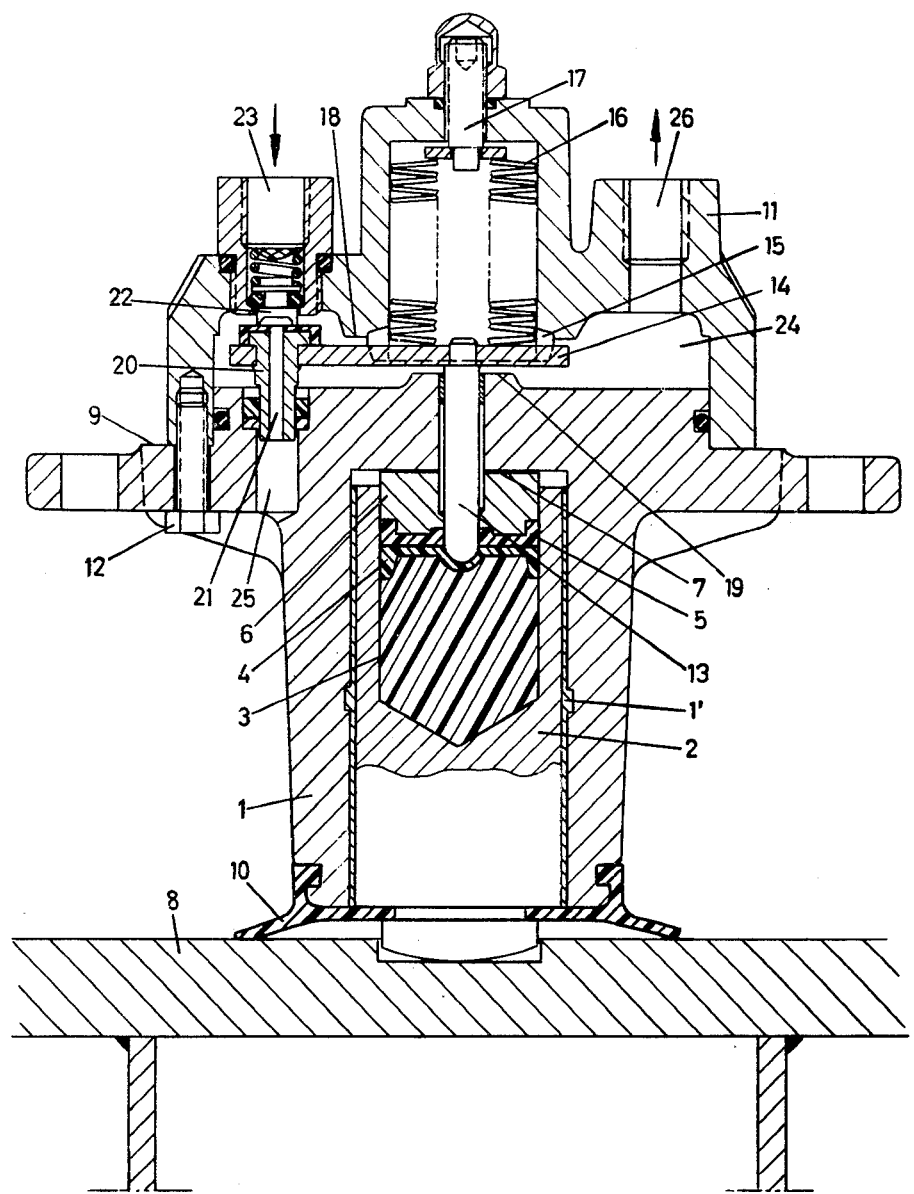

DEVICE RESPONSIVE TO VEHICLE LOADING WITH SIGNAL GENERATING MEANS FOR BRAKE ACTUATION

This invention relates to a device transmitting a signal when the force acting on the device passes a predetermined value.

Devices of this kind are commonly used e.g. on railway vehicles to activate servomotors which govern the vehicle brakes to be applied at a higher or lower force. As a result the brake force will be at a high level if the vehicle is loaded and at a low level if the vehicle is empty.

The object of the present invention is to obtain a device of the kind referred to above which is very easy to install because of its small dimensions and which is reliable in operation between extremely long service intervals. Another object is to obtain a simple and cheap construction.

According to the present invention the device is characterised in that it comprises a plastically deformable, enclosed body, on which the force is acting via a piston in the device, and a rod in contact with the body, said force acting axially on the rod, being counteracted by a spring and the rod being axially movable between two stops and connected to signal generating means.

The invention will be described in more detail reference being made to the drawing showing a device according to the invention in vertical section.

The device shown comprises a housing 1 having a central bore adapted to receive a piston 2. The piston 2 is also provided with a central bore partly filled with a plastically deformable body 3 of a viscous silicone-based elastomer. A sealing member 4 in the form of a flexible polyurethane or Teflon is placed on the top of the body 3 and is backed by a backing ring 5 made of a comparatively more stiff plastic material such as Delrin. A force-transmitting plug 6 is inserted between the backing ring 5 and a shoulder wall 7 of the bore in the housing 1. An axial gap exists between the piston 2 and the wall 7. A gland 10 is mounted between the lower end of the housing 1 and the vehicle part 8 in order to prevent entrance of dirt and water. A friction-reducing sleeve 1' is mounted in the bore in the housing 1.

The piston 2 rests on a part 8 of a vehicle and the housing 1 is provided with a flange 9 adapted to receive the weight of another vehicle part (not shown). The force between the vehicle parts will be transmitted via the piston 2, the body 3, the sealing member 4, the backing ring 5, the plug 6 and the housing 1.

The housing 1 is provided with a cover 11 bolted to the housing 1 by a number of bolts 12. A rod 13 extending down through the plug 6 and into the body 3 is rigidly secured to an arm 14, being partly located in a guiding slot 15 in the cover 11. The arm 14 is backed by a spring for example in the form of a number of stacked belleville washers 16, the upper end of which may be adjusted by a screw 17. The arm 14 is movable between a shoulder surface 18 on the cover 11 and a shoulder surface 19 on the housing 1.

The arm 14 carries a valve stem 20 provided with a central bore 21 and axially guided in a bore 25 in the housing 1. Said valve stem 20 is adapted to engage a valve member 22 which when moved upwards will open a passage between a pipe connection 23 and a chamber 24 between the housing 1 and the cover 11.

If the valve stem 20 is moved downwardly from the position shown the bore 21 will become uncovered and thus vent the chamber 24 through bore 25 in which the valve stem 20 is axially movable.

The weight of a vehicle load for example exerted on flanges 9 will be transmitted to housing 1 and by way of cover 11, adjustment screw 17 and the belleville washers 16 to the rod 13. Piston 2 may move within cylinder sleeve 1' relative to housing 1 as a function of the weight by means of contact of piston 2 with part 8, which might be the frame of the vehicle. As the force or weight between flange 9 and part 8 varies then rod 13 may be moved vertically back and forth against a spring bias force relative to cover 11 and housing 1 by means of contact with piston 2 through body 3. Depending upon the adjustment of screw 17 the spring counter force and therefore the movement of rod 13 caused by the force may be adjusted. When the force on rod 13 to the belleville washers 16 exceeds the spring force the washers 16 will be compressed to determine the degree of movement of arm 14 attached to rod 13. This movement controls a servomechanism (not shown) by means of the valve 14, 20, 21, 22 operable from pressure of compressed air entering 23 and made available as a function of movement of rod 13 at 26.

The device described will operate as follows:

When the flange 9 is loaded by a weight, the rod 13 is exposed to a force in the direction downwards transmitted by the stacked springs 16. The said force is balanced by the pressure in the body 3 exerting an upwardly directed force on the rod 13 transmitted from member 8. In case the load on the vehicle at flange 9 is increased above the spring tension of belleville washers 16, the pressure in the body 3 will tend to move the rod 13 upwards relative to housing 1 against the spring bias force of belleville washers 16. Such upward movement—which will be limited by the arm 14 engaging the surface 18—will cause movement of valve member 22 thereby opening a passage between the connection 23 and the chamber 24. Compressed air delivered at 23 may now enter into the chamber 24 and may be transmitted to a servomotor (not shown) via a pipe connection 26.

In case the load on the vehicle is decreased the pressure in the body 3 on rod 13 will decrease. The springs 16 will now move the rod 13 downwards and the arm 14 will upon moving downward from limit 18 close the passageway between 23 and 24 in the shown position of vavle 22 and upon further movement downward will cause valve stem 20 to move downward and cease to contact the valve member 22. The interior of the chamber 24 will now be vented to the atmosphere and the pressure in the pipe connected at 26 will decrease.

We claim:

1. A device for transmitting a signal in response to an actuating force acting on the device such as weight of an object, comprising in combination, a housing, a piston movable in said housing, means transmitting said force to bear upon said housing and said piston to tend to move said piston in said housing as a function of the force, an enclosed plastic deformable body movable by said piston, a rod contacting said body to produce a movement thereby with said piston which is a function of said force, spring threshold means biasing said rod against said movement until said force exceeds a predetermined value overcoming the spring bias, and signal generating means actuated by movement of said rod, wherein said signal generating means comprises means supplying compressed air into a signal passageway for said compressed air in response to a valve member movable by said rod upon a movement of said piston by said actuating force, wherein said signal passageway includes a pressure chamber, and means controlled by movement of said rod to decrease pressure in said chamber when said force is at a predetermined value.

2. A device as defined in claim 1, wherein the valve member comprises a member axially movable by said rod to two positions, in one of which said air is released into said signal passageway and in the other of which the pressure in said chamber is decreased.

* * * * *